No. 813,985. PATENTED FEB. 27, 1906.
C. A. MADSEN.
MACHINE FOR SEALING AND STAMPING ENVELOPS.
APPLICATION FILED JUNE 21, 1902.
7 SHEETS—SHEET 1.
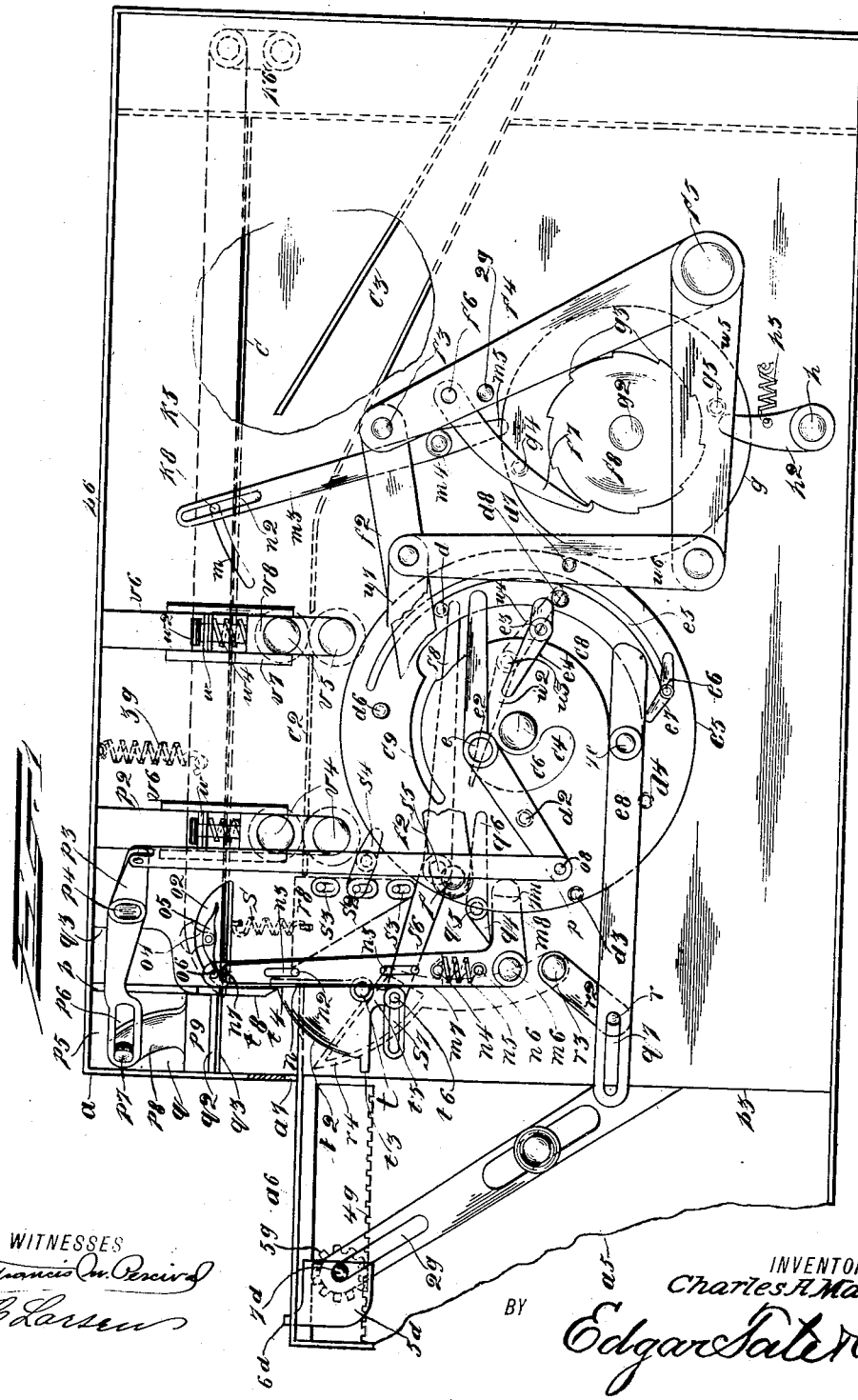
WITNESSES
INVENTOR
Charles A. Madsen
BY
Edgar Tate & Co
ATTORNEYS

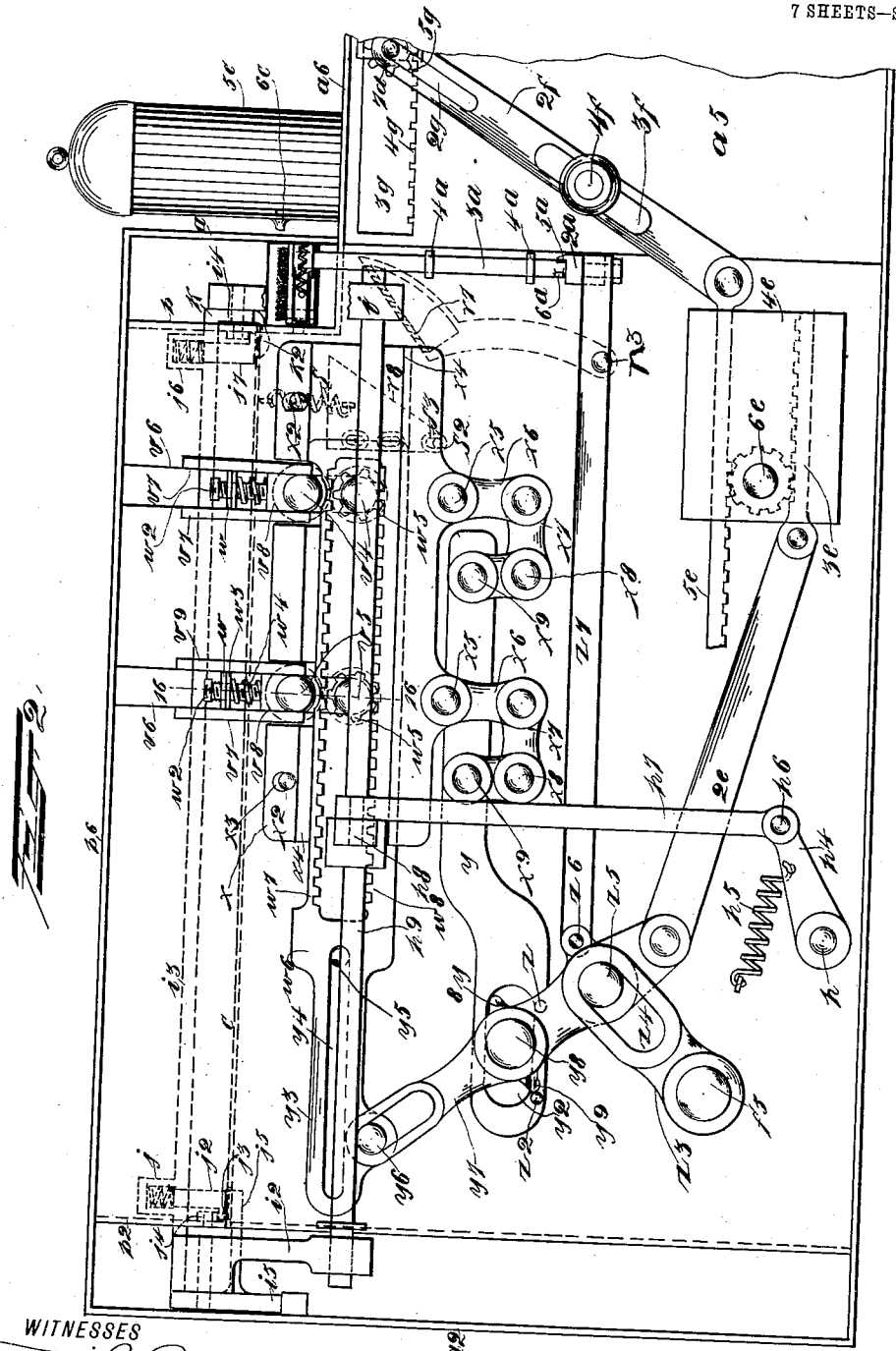

No. 813,985. PATENTED FEB. 27, 1906.
C. A. MADSEN.
MACHINE FOR SEALING AND STAMPING ENVELOPS.
APPLICATION FILED JUNE 21, 1902.
7 SHEETS—SHEET 3.
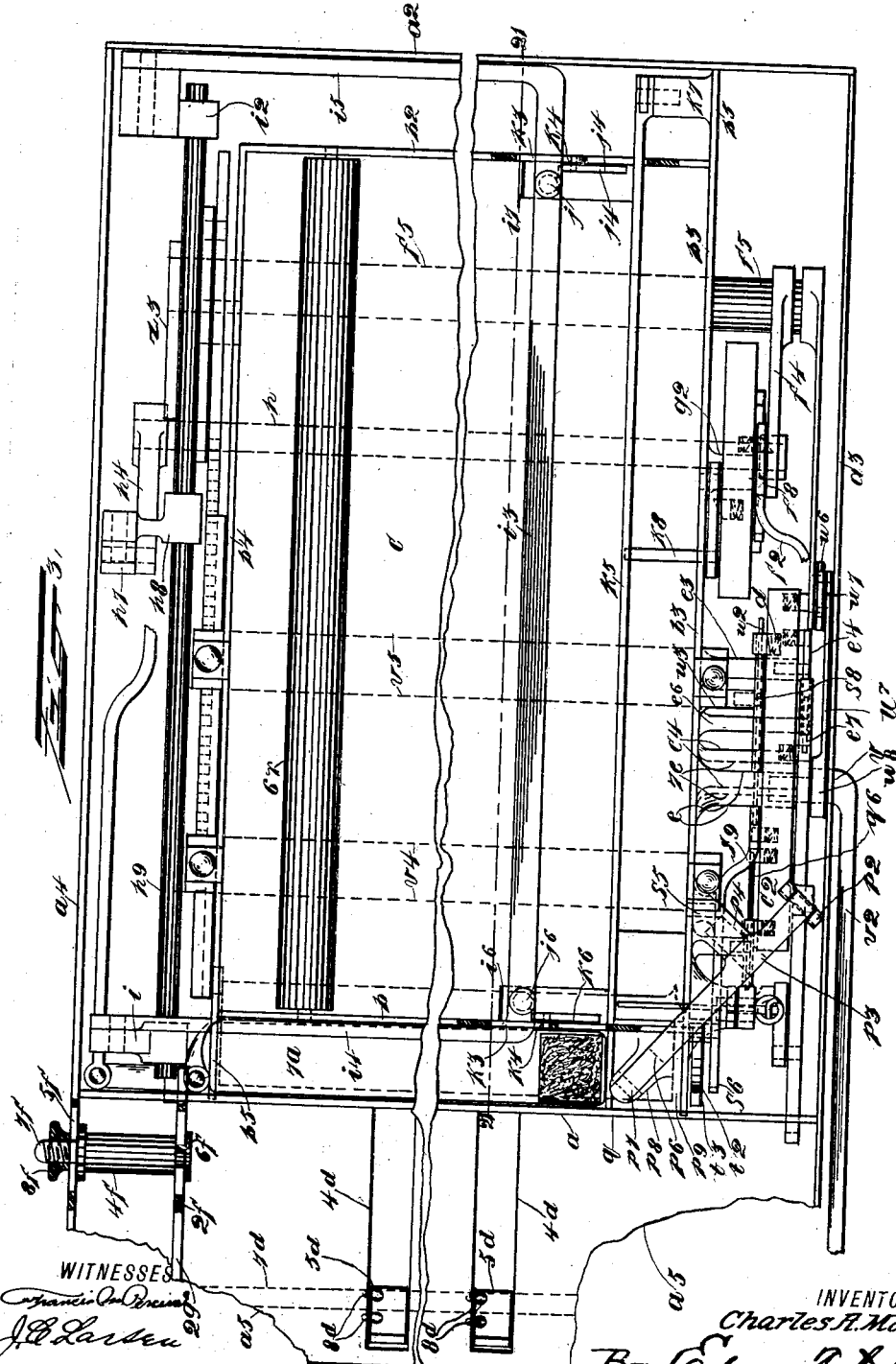
WITNESSES
INVENTOR
Charles A. Madsen
By Edgar Tate & Co
ATTORNEYS

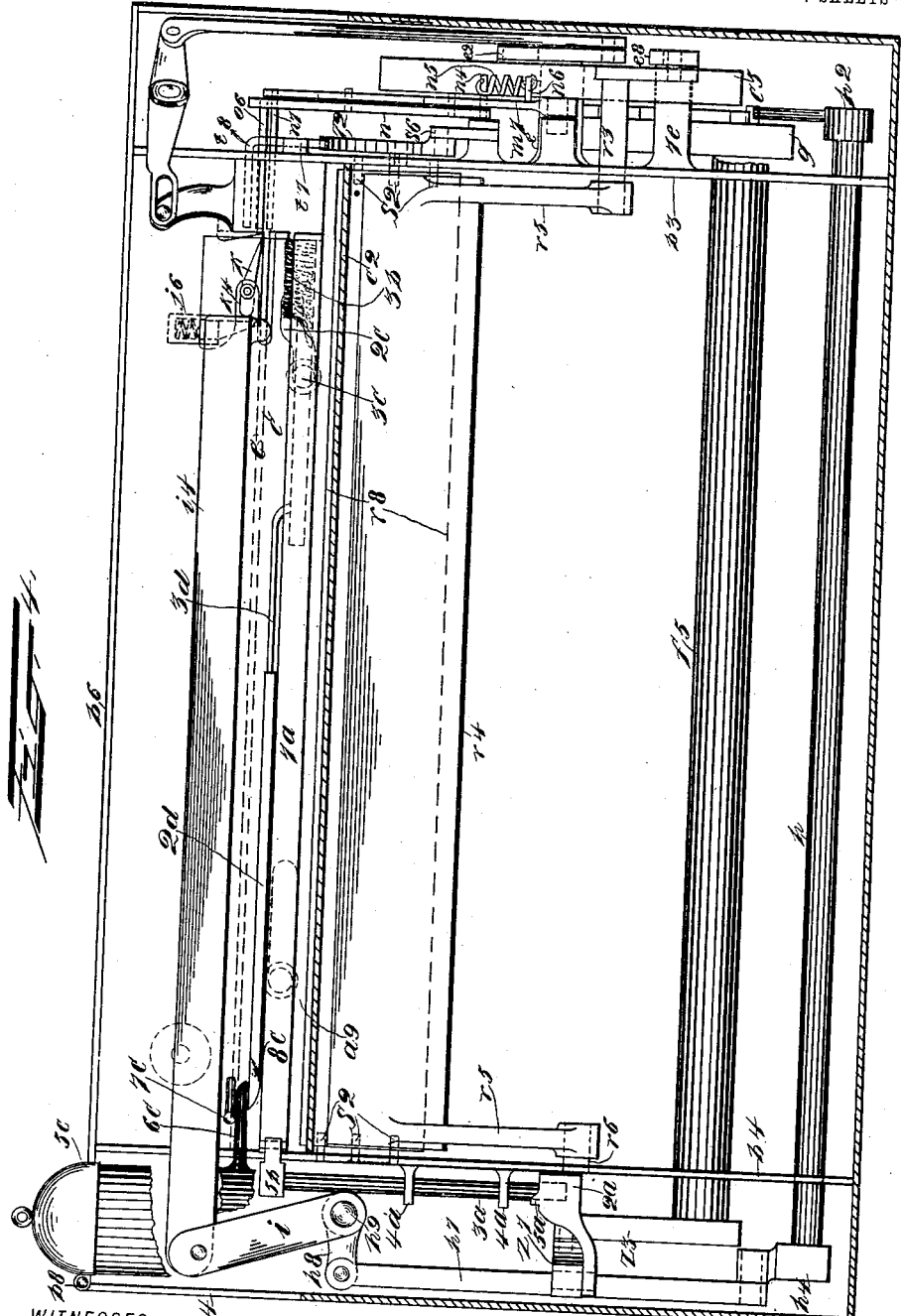

No. 813,985. PATENTED FEB. 27, 1906.
C. A. MADSEN.
MACHINE FOR SEALING AND STAMPING ENVELOPS.
APPLICATION FILED JUNE 21, 1902.
7 SHEETS—SHEET 5.
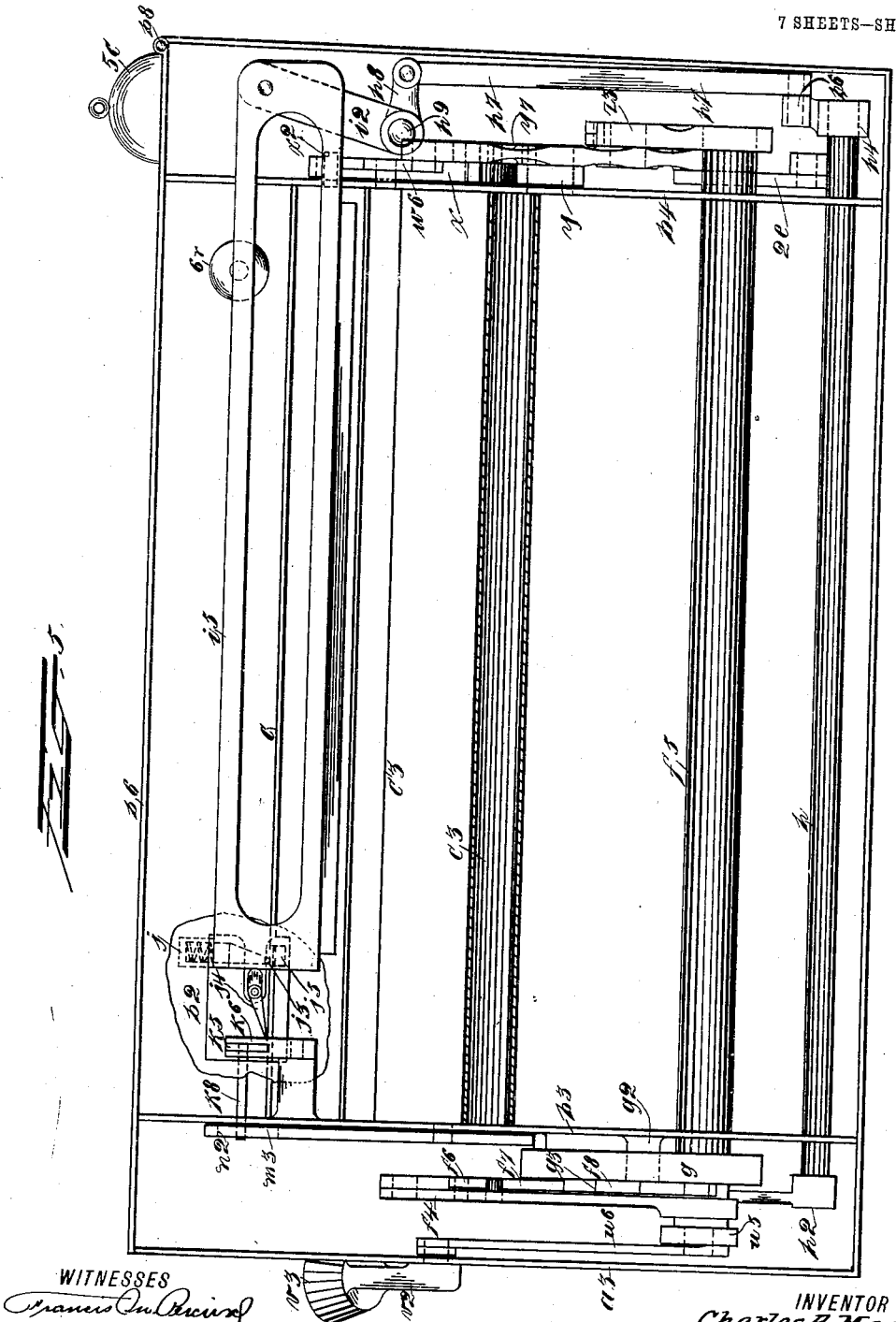
WITNESSES
INVENTOR
Charles A. Madsen
BY
Edgar Tate & Co
ATTORNEYS

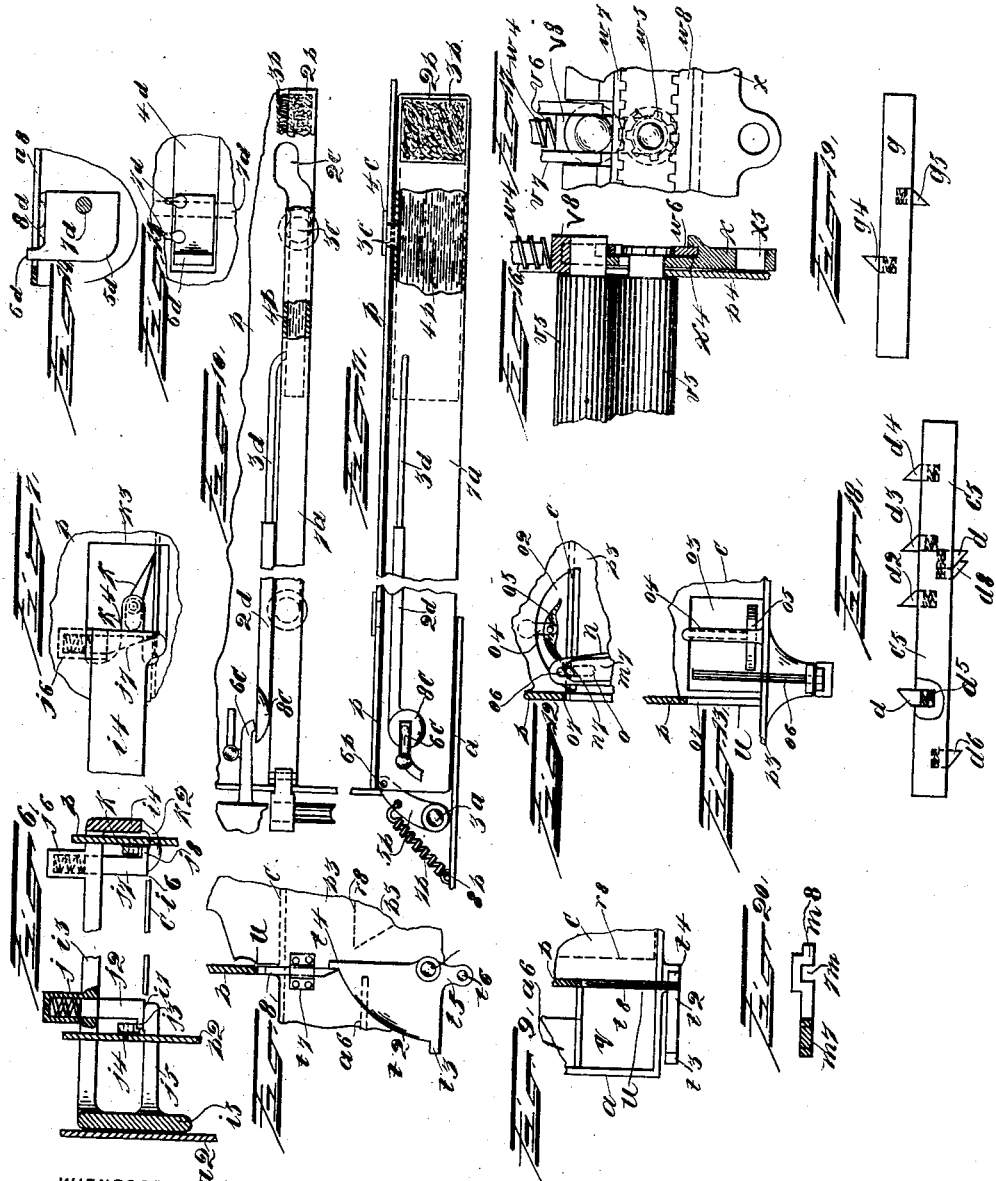

No. 813,985. PATENTED FEB. 27, 1906.
C. A. MADSEN.
MACHINE FOR SEALING AND STAMPING ENVELOPS.
APPLICATION FILED JUNE 21, 1902.
7 SHEETS—SHEET 7.
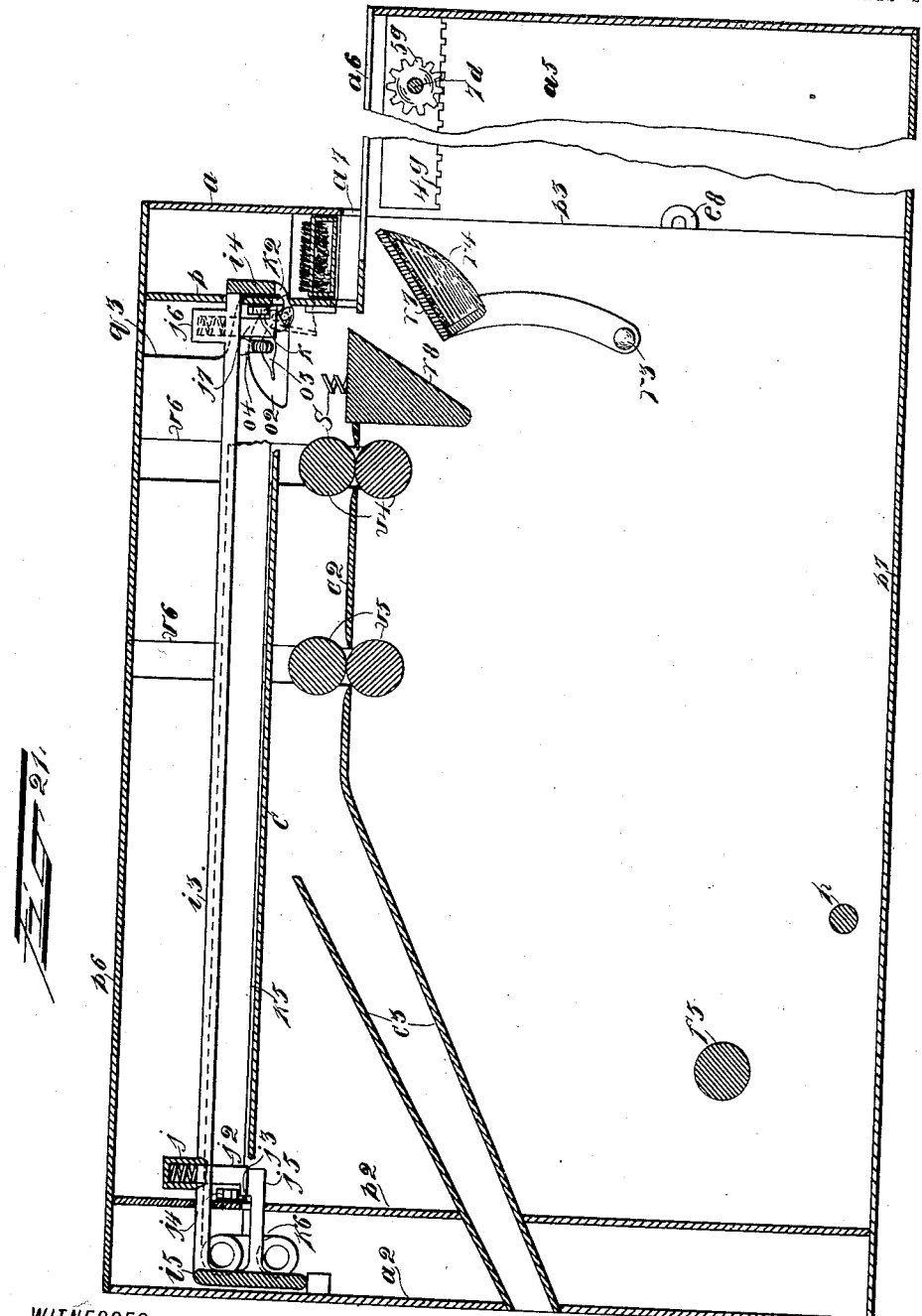
WITNESSES
INVENTOR
Charles A. Madsen,
BY
Edgar Tate & Co
ATTORNEYS

UNITED STATES PATENT OFFICE.

CHARLES A. MADSEN, OF BROOKLYN, NEW YORK.

MACHINE FOR SEALING AND STAMPING ENVELOPS.

No. 813,985.      Specification of Letters Patent.      Patented Feb. 27, 1906.

Application filed June 21, 1902. Serial No. 112,563.

*To all whom it may concern:*

Be it known that I, CHARLES A. MADSEN, a citizen of the United States, residing at Brooklyn, in the county of Kings and State of New York, have invented certain new and useful Improvements in Machines for Sealing and Stamping Envelops, of which the following is a full and complete specification, such as will enable those skilled in the art to which it appertains to make and use the same.

The object of this invention is to provide an improved machine for sealing and stamping envelops and which will moisten the flap of the envelop, fold said flap, stamp the envelop and seal it, this operation being performed by one downward and upward movement of a hand-lever with which the machine is provided, a further object being to provide a machine of this class which is simple in construction and operation and by means of which envelops in large quantities may be quickly sealed and stamped at a minimum expense.

The invention is fully disclosed in the following specification, of which the accompanying drawings form a part, in which the separate parts of my improvement are designated by the same reference characters in each of the views, and in which—

Figure 1 is a right side elevation of a machine embodying my invention, part of the front end being broken away and the outer side wall of the main outer casing being removed, part of the operative parts being also broken away; Fig. 2, a left side elevation of the machine with the outer side wall of the main outer casing removed and a part of the front end broken away; Fig. 3, a plan view of the machine with the top of the main outer casing removed and part of the front end thereof broken away, the machine being also divided or broken longitudinal of the middle thereof; Fig. 4, a sectional front end view of the machine, part of the front end thereof being removed and showing only the front operative parts; Fig. 5, a rear end view with the rear end wall of the main outer casing removed, together with the rear end wall of the inner frame or casing which supports the operative parts of the machine and showing only the rear operative parts; Fig. 6, a sectional view of a detail of part of the stamp-placing mechanism looking from the left side of the machine; Fig. 7, a side view of the construction shown in Fig. 6; Fig. 8, a side view of another part of the stamp-placing mechanism; Fig. 9, a plan view of the construction shown in Fig. 8; Fig. 10, a front view of a part of the stamp-moistening mechanism; Fig. 11, a plan view thereof; Fig. 12, a side view of another detail of the stamp-placing mechanism; Fig. 13, a plan view thereof; Fig. 14, a side view of a part of the means for feeding the envelops into the machine; Fig. 15, a plan view thereof; Fig. 16, a partial section on the line 16 16 of Fig. 2; Fig. 17, a side view thereof; Fig. 18, a rear edge view of a main operating disk or wheel which I employ; Fig. 19, a plan view of another operative disk or wheel which I employ, the wheel or disk shown in Figs. 18 and 19 being both at the right-hand side of the machine; Fig. 20, a sectional plan view of a detail of the stamp-shifting mechanism, and Fig. 21 a longitudinal section on the line 21 21 of Fig. 3.

In the practice of my invention as shown in the drawings I provide a main outer casing, comprising a front end plate or wall $a$, a rear end plate or wall $a^2$, a right side plate or wall $a^3$, and a left side plate or wall $a^4$. At the front end of the machine this main outer casing is provided with an extension $a^5$, having a top plate $a^6$, which constitutes the envelop-table on which the envelops are placed before being fed into the machine, and at the point where the plate $a^6$ and the front plate or wall $a$ of the main outer casing meet there is a transverse slot $a^7$, through which the envelops pass.

Within the main outer casing is an inner frame, comprising a front end plate or wall $b$, a rear end plate or wall $b^2$, a right side plate or wall $b^3$, and a left side plate or wall $b^4$, and this inner frame which supports the operative parts of the machine is rigidly connected with the main outer casing by extending the side walls of the inner frame, as shown at $b^5$, or in any desired manner, and as thus constructed it will be seen that the inner frame is of less dimension than the main outer frame, and there is thus provided a space which extends entirely around the inner frame.

The main outer casing is also provided with a top $b^6$ and, preferably, with a bottom $b^7$, and the top $b^6$ is hinged to the left-hand side of said main outer casing, as shown at $b^8$. The inner frame is provided at the top thereof with a stamp-table $c$, and beneath the front end of said stamp-table is placed a supplemental envelop-table $c^2$, which terminates rearwardly adjacent to a downwardly and backwardly inclined chute $c^3$, through which the envelops pass as they are discharged from the machine.

At the right-hand side of the inner frame and forward of the transverse middle thereof the side plate $b^3$ of said frame is provided with a stud $c^4$, on which is mounted a disk or wheel $c^5$, and the disk or wheel $c^5$ is provided with a concentric slot $c^6$ near the center thereof and at the opposite side with a longer concentric slot $c^8$, the upper end of which in the position of the parts shown in Fig. 1 is provided with an extension $c^9$. The disk $c^5$ is also provided on its inner side with four spring-operated pins $d$, $d^2$, $d^3$, and $d^4$, all of which are placed in sockets formed in the inner side of said disk $c^5$, and in each of said sockets is placed a spring $d^5$, and the outer side of said disk $c^5$ is provided with three spring-operated pins $d^6$, $d^7$, and $d^8$. Adjacent to the stud $c^4$, which carries the disk $c^5$, and above and slightly to the front thereof, is a similar stud $e$, which is also secured to or formed on the plate $b^3$ and which passes outwardly through the slot $c^6$ in the disk $c^5$, and secured to the outer end thereof is a lever $e^2$, one arm of which in the position of the parts shown in Fig. 1 projects forwardly and downwardly and the other backwardly. The plate $b^3$ of the inner frame is also provided with another stud $e^3$, which passes outwardly through the slot $c^8$ in the disk $c^5$, and connected with the outer end of this stud is a lever $e^4$, the longer arm of which projects forwardly and upwardly and the shorter arm backwardly, and the disk $c^5$ is also provided at the outer side of the concentric slot $c^8$ with another longer and narrower slot $e^5$, and secured to the plate $b^3$ is another stud $e^6$, which passes outwardly through the slot $e^5$ and the outer end of which is provided with a short lever $e^7$, one end of which projects upwardly and forwardly and the other backwardly. Another stud $7^e$ is secured to the plate $b^3$ of the inner frame and passes outwardly, and connected with the outer end thereof is a lever $e^8$. Pivoted to the outer side of the disk $c^5$, near the front upper edge thereof, at the point $f$ is a link member $f^2$, the central portion of which is broken away in Fig. 1, and this link member $f^2$ extends backwardly and upwardly and is pivotally connected at $f^3$ with an arm $f^4$, rigidly secured to a shaft $f^5$, which passes transversely through the rear bottom portion of the machine, and connected with the inner side of the arm $f^4$ at $f^6$ is a pawl $f^7$, which operates in connection with a ratchet-disk $f^8$, connected with a disk $g$, which is mounted on a stud $g^2$, which is secured to the plate $b^3$ of the inner frame of the machine in front of and slightly above the shaft $f^5$. The disk $g$ and the ratchet-disk $f^8$ may be rigidly connected in any desired manner and may be formed integrally, and said ratchet-disk $f^8$ is provided with ten teeth $g^3$. The disk $g$ is provided on its inner side with a spring-operated pin $g^4$ and on its outer side with another spring-operated pin $g^5$, and these pins $g^4$ and $g^5$ and all the spring-operated pins on both sides of the disk $c^5$ are inclined in the manner shown, or the outer end thereof is beveled at one side for the purpose hereinafter described and as shown in Figs. 18 and 19.

Below the disk $g$ and passing transversely through the machine near the bottom thereof is a shaft $h$, the right-hand end of which is provided with an upwardly-directed arm $h^2$, which is adapted to be operated by the spring-pin $g^5$ and which is held in its normal position by a spring $h^3$, which is secured thereto and to the plate or wall $b^3$, and the left-hand end of the shaft $h$ is provided with an arm $h^4$, which extends upwardly and forwardly and to which is secured a spring $h^5$, which is also secured to the left-hand plate or wall $b^4$ of the inner frame or support of the machine. Pivotally connected at $h^6$ with the arm $h^4$ is a vertically-arranged bar $h^7$, the upper end of which is pivotally connected with an arm $h^8$, rigidly secured to a shaft $h^9$, arranged longitudinally and horizontally at the left side of the machine and outside of the plate or wall $b^4$. The shaft $h^9$ is provided at its front end with an arm $i$ and at its rear end with an arm $i^2$, and pivotally connected with the arms $i$ and $i^2$ is a yoke-shaped stamp-sheet shifter, consisting of a longitudinal bar $i^3$, placed above the stamp-table $c$ and having end members $i^4$ and $i^5$, as shown in Figs. 2, 3, and 6, said end members $i^4$ and $i^5$ being connected with the arms $i$ and $i^2$ of the shaft $h^9$, and the end member $i^5$ of the stamp-sheet shifter is preferably double and consists of two parallel parts, as shown in Fig. 5. The stamp-table $c$ is provided at its front end and near the right-hand corner with an opening $i^6$ and at the rear end with a similar opening $i^7$. The bar $i^3$ of the stamp-sheet shifter is provided at the rear end with a vertically-arranged keeper $j$, in which is mounted a vertically-movable spring-depressed pin $j^2$, having a backwardly-directed projection $j^3$, and this projection operates beneath a dog $j^4$, pivoted to the plate $b^2$ at the rear end of the inner frame, and the part $i^5$ of the yoke-shaped stamp-sheet shifter is provided with an inwardly-directed finger $j^5$, which supports the pin $j^2$ and holds it in operative position. At the front end of the machine the bar $i^3$ of the stamp-sheet shifter is provided with a vertically-arranged keeper $j^6$, in which is mounted a vertically-movable pin $j^7$, provided at its lower end with a finger $j^8$, which operates in connection with a dog $k$, similar to the dog $j^4$, and which is pivoted to the front end wall $b$ of the inner frame, and the said member $i^4$ of the yoke-shaped stamp-sheet shifter is provided with a finger $k^2$, which normally supports the pin $j^7$.

It will be observed that the front end wall $b$ of the inner frame and the rear end wall $b^2$ of said frame are provided with openings $k^3$, through which the bar $i^3$ of the stamp-sheet shifter passes, and the dogs $j^4$ and $k$ are pivoted to projections $k^4$, which extend to the right in these openings.

That part of the construction hereinbefore described, with the exception of certain parts connected with the disk $c^5$, relates to the means for shifting a sheet of stamps on the table $c$, and I will now proceed to describe the means for cutting off a strip of stamps from said sheet and applying the stamps successively to envelops as they are fed through the machine, the means for feeding the envelops through the machine being afterward described.

In practice a sheet of stamps is placed on the table $c$, and said sheet preferably contains one hundred stamps and is placed between the end members $b$ and $b^2$ of the inner frame and the left-hand wall or member $b^4$ and a cutter or knife $k^5$, which will be hereinafter described, and the distance between the cutter or knife $k^5$ and the opposite member $b^4$ of the inner frame is the same as the distance between the front end wall $b$ and the rear end wall $b^2$ thereof. The knife $k^5$ is pivoted at one end to a link $k^6$, which is pivoted to a stud $k^7$, connected with the right side wall $b^3$ of the inner frame, and this knife extends forwardly to the front wall $b$ of said frame over the stamp-table $c$. Connected with the knife $k^5$ centrally thereof is a pin $k^8$, which extends outwardly through a slot $m$ in the right side wall $b^3$ of the inner frame and passes through slot $n^2$ in a lever $m^3$, pivoted at $m^4$ to the right side wall $b^3$ of the inner frame and provided with a downwardly-directed extension $m^5$, which is adapted to be operated by the pin $g^4$, with which the disk $g$ is provided, and in the construction of the machine, as hereinafter described, the sheet of stamps is fed forwardly a distance equal to the width of one strip of stamps, and this strip is cut off by the knife $k^5$, as hereinafter described.

The devices for moving the strips of stamps forward and for cutting off stamps at the end thereof and applying them to envelops are constructed as follows: Pivoted to the outside wall $b^3$ of the inner frame at $m^6$ is a lever $m^7$, which extends upwardly and the lower end of which is provided with a short backwardly-directed arm $m^8$, and connected with the inner side of this lever is a bar $n$, provided with pins $n^2$, which pass through corresponding slots $n^3$ in said lever $m^7$, and secured to the lower end of this bar at $n^4$ is a spring $n^5$, which is also secured to the lever $m^7$ at $n^6$. The lever $m^7$ is provided at its upper end with a pin $n^7$, which passes through a vertical slot $o$ in the upper end of the bar $n$, (shown in dotted lines in Fig. 12,) and this pin passes inwardly through the opening $o^2$ in the plate or wall $b^3$, as shown in Fig. 1. The stamp-table $c$ is also provided with an opening $o^3$ at the point where the pin $n^7$ passes inwardly, and the opening $o^2$ is of the form shown in Figs. 1 and 12, the upper wall thereof being curved upwardly and the bottom wall being horizontal, and suspended from the plate or wall $f^3$ above the opening $o^2$, by means of a hanger $o^4$, is a pivot-dog $o^5$, which projects forward and downward and backward and downward and the points or ends of which are curved downwardly, as clearly shown in Fig. 12, and in the normal position of these parts the forward end of the dog $o^5$ rests on the pin $n^7$. The upper end of the bar $n$ is also provided with an inwardly-directed pin $o^6$, which is parallel with the pin $n^7$ and also extends inwardly through the opening $o^2$ in the plate or wall $b^3$, and in the position shown this pin rests on the forward end of the dog $o^5$. The hanger $o^4$ is loop-shaped in form, the bow end thereof projecting inwardly, and this allows the pin $o^6$ to pass over the dog $o^5$ in the operation of the machine, as hereinafter described, and at the front of the opening $o^2$ in the plate or wall $b^3$ and over the stamp-table $c$ is a slot $o^7$, through which the envelops are passed in the operation of the machine. Pivoted to the forward end or arm of the lever $e^2$, as shown in Fig. 1 at $o^8$, is a vertically-arranged bar $p$, which extends upwardly and the upper end of which is pivotally connected at $p^2$ with a lever $p^3$, pivoted at $p^4$ to the side wall $b^3$ of the inner frame or to a stud formed thereon or secured thereto, and this lever ranges transversely of the right-hand forward corner of the machine and passes through an opening $p^5$ in the plate or wall $b^3$ of the inner frame, and said lever is provided at its forward end with a slot $p^6$, through which passes a pin $p^7$, connected with the arm $p^8$ of a plunger $p^9$, which is of the same dimensions as an ordinary stamp and which is adapted to move in a vertical space $q$ in the right-hand front corner of the machine, and this plunger is provided on the bottom thereof with a steel plate $q^2$, the sides of which, and especially the side adjacent to the front plate or wall $b$ of the inner frame, are provided with a sharp edge, and in practice the plate $b^3$ is cut out at the upper front corner of the machine, as indicated at $q^3$ in Fig. 1, and the operation of the plunger $p^9$ in cutting off a stamp and placing the same on an envelop will be hereinafter described.

In the operation of the machine the lever $m^7$ is thrown backwardly by a dog $q^4$, pivoted at $q^5$ to the plate or wall $b^3$ of the inner frame, and this dog $q^4$ is provided with a backwardly-directed member $q^6$, (shown in dotted lines in Fig. 1,) and in the operation of the machine the pin $d^2$ strikes the backwardly-directed extension or member $q^6$ of the dog $q^4$. The lever $m^7$ is thrown forward by the pin $d^4$, which strikes the under side of the arm $m^8$ of said lever, and said arm is provided with a transverse recess $7^m$ on its outer side, (shown in Fig. 20,) through which the pin $d^3$ passes. The lever $e^3$ is provided at the front end with the longitudinal slot $q^7$, through which passes a pin $r$, connected with an arm $r^2$, rigidly secured to the stub-shaft $r^3$, which passes through the right wall or plate $b^3$ of the inner frame, as shown in Figs. 1 and 4.

Placed transversely in the inner frame of the machine at the front end thereof is a moistening-tank $r^4$, which is preferably of the form shown, being substantially triangular in cross-section and the front wall thereof being convex and the rear wall flat or straight, and this tank is provided at each end with an arm $r^5$, one of which is rigidly connected with the stub-shaft $r^3$ and the other with a suitable support at $r^6$ at the left-hand side of the machine, and thus constructed the moistening-tank $r^4$ is adapted to be swung forwardly and backwardly, and the rear wall of this moistening-tank is finely perforated and provided with a moistening-pad $r^7$, as shown in section in Fig. 21. Arranged transversely of the inner frame and rearwardly of the moistening-tank is a vertically-movable envelop-flap folder $r^8$, (shown in dotted lines in Fig. 1 and the upper edge of which is shown in full lines in Fig. 4 and the bottom edge in dotted lines,) and this folder is also triangular in cross-section, the front side thereof being inclined downwardly and backwardly and the top being flat and in its normal position slightly above the supplemental table $c^2$, as indicated in Figs. 1 and 2. The folder $r^8$ is held in its normal position by spring $s$, connected therewith and with the stamp-table $c$, or these springs may be connected with the side walls $b^3$ and $b^4$ of the inner frame of the machine, and said folder is also provided at its opposite ends with pins $s^2$, which pass through corresponding slots $s^3$ in said side walls $b^3$ and $b^4$ of the inner frame, and at one end of the folder $r^8$ a short lever $s^4$ is pivoted to the right side wall $b^3$ of the inner frame and connected with one of the pins $s^2$ at its forward end, and the other end of this lever projects backwardly and is adapted to be operated by the pin $d^3$ of the disk $c^5$ in the operation of the machine, as hereinafter described.

Pivoted to the wall $b^3$ of the inner frame at $s^5$ is a lever $s^6$, having a forwardly-directed arm provided with a slot $s^7$ and a backwardly-directed arm $s^8$, which is adapted to be operated by the pin $d$ of the disk $c^5$, and the backwardly-directed arm $s^8$ of the lever $s^6$ is curved outwardly, as shown at $s^9$ in Fig. 3.

Pivoted to the said plate or wall $b^3$ of the inner frame at $t$ is a plate $t^2$, which is somewhat similar in form to the sector of a circle, the outer edge thereof being circular in form, but one side thereof being longer than the other, and this plate is provided at the corners opposite its pivotal support with two projections $t^3$ and $t^4$, the projection $t^4$ being farthest from the pivot-pin $t$. The plate $t^2$ is also provided with a downwardly-directed projection $t^5$, having a pin $t^6$, which passes through the slot $s^7$ in the lever $s^6$, and mounted on the plate $b^3$ above the plate $t^2$ is a keeper $t^7$, (shown in detail in Fig. 8,) in which is placed an L-shaped stamp-holder $t^8$, one arm of which projects downwardly in the direction of the pivotal support of the plate $t^2$ and the other arm of which projects through the plate or wall $b^3$ of the inner frame and transversely over the stamp-table $c$, as clearly shown in Figs. 1, 4, 8, and 9, and the front wall $b$ of the inner frame is cut out at this point, as shown at $u$, to receive the upper transverse member of the stamp-holder $t^8$, and the operation of these parts in connection with the other stamp-applying mechanism will be hereinafter described. The lever $s^6$ or the rear end thereof is operated by a lever $u^2$, pivoted to the side plate or wall $b^3$ of the inner frame at $u^3$ and provided with a backwardly-directed member $u^4$, which in practice is operated by the pin $d$ of the disk $c^5$, and the operation of the lever $u^2$ in connection with lever $s^6$ will be hereinafter described.

I will now proceed to describe the devices for passing an envelop through the machine, in which operation the envelop is folded, sealed, and stamped.

Connected with the shaft $f^5$ at the right-hand side of the machine is an arm $u^5$, which extends forwardly and with which is pivotally connected a link $u^6$, which extends upwardly and is pivotally connected with an arm $u^7$, which extends forwardly, as shown in Fig. 3, and is provided with a head $u^8$, which is rigidly connected with the shank $v$ of the main operating-lever $v^2$, which passes through the outside plate $a^3$ of the main outer casing of the machine, as is clearly shown in Fig. 3, and the main operating-lever $v^2$ projects forwardly and is preferably provided with a handle $v^3$. Mounted transversely of the machine and above and below the supplemental envelop-table $c^2$ are two pairs of rollers $v^4$ and $v^5$, the first-named pair being forward of the last-named pair, and the supplemental envelop-table $c^2$ is cut out or cut away between members of both pairs of these rollers, so that the separate rollers of the said pairs which are mounted one above the other are in frictional contact. The separate pairs of rollers $v^4$ and $v^5$ are mounted in vertically-arranged slots or openings $v^6$ in the side walls $b^3$ and $b^4$ of the inner frame, and the shafts of these rollers pass through these slots or openings, and said slots or openings are provided with reinforcing side supports $v^7$, and on the ends of the shafts of the upper rollers at each side are placed spring-depressed blocks $v^8$, and above these blocks $v^8$ are secured stationary bearing-plates $w$, through which are passed set-screws $w^2$, which are provided below the bearings or plates $w$ with collars $w^3$, between which and the blocks $v^8$ are placed spiral springs $w^4$, and by adjusting the screws $w^2$ the pressure on said shafts or the friction between each of the pairs of rollers $v^4$ and $v^5$ may be adjusted. The bottom rollers of each of the pairs of rollers $v^4$ and $v^5$ are provided at the left-hand side of the machine with pinions $w^5$, and in the operation of the machine, as hereinafter described, these rollers are always turned in the backward direction, so as to feed the envelops backwardly through the machine, this operation being accomplished by a double rack-bar $w^6$, having top and bottom members $w^7$ and $w^8$, which are parallel and the teeth of which are directed inwardly. Connected with the left-hand side of the machine or with the plate $b^4$ of the inner frame is a vertically-movable plate $x$, which is connected with said plate $b^4$ by means of pins $x^2$, secured to said plate $b^4$ and passing through vertical slots or openings $x^3$ in the plate $x$, and the plate $x$ is also provided on its outside and centrally thereof with a longitudinal depression $x^4$, in which the rack-bar $w^6$ moves, and the ends of the shafts of the bottom rollers $v^4$ and $v^5$ at the left-hand side of the machine pass centrally through the plate $x$, and the pinions $w^5$ on the ends thereof fit in the longitudinal space between the separate sides $w^7$ and $w^8$ of the rack-bar $w^6$, and this space is slightly greater in width than the transverse diameter of said pinions. Pivotally connected with the lower side of the plate $x$ at predetermined points, as shown at $x^5$, are links $x^6$, with the lower ends of which are pivotally connected crank-levers $x^7$, which are pivotally connected with the plate $b^4$ at $x^8$, and one arm of the crank-levers $x^7$ is pivotally connected at $x^9$ with a bar $y$, which ranges longitudinally of the side of the machine adjacent to the plate $b^4$ of the inner frame and the rear end of which is provided with a slot $y^2$. The rack-bar $w^6$ is provided with a backwardly-directed extension $y^3$, having a longitudinal slot $y^4$, through which passes a pin $y^5$, secured to the plate $b^4$ of the inner frame of the machine, and pivotally connected with the backwardly-directed extension $y^3$ of the rack-bar $w^6$ at $y^6$ is a lever $y^7$, having a journal $y^8$, which passes through the slot $y^2$ in the bar $y$ and forms a fulcrum for said lever, and the lever $y^7$ is provided on the opposite sides of its fulcrum or journal with projections $8^y$ and $y^9$, which operate in connection with corresponding points or projections $z$ and $z^2$ on the end portion of the bar $y$ below the slot $y^2$. The left-hand end of the shaft $f^5$ is also provided with a right arm $z^3$, having a longitudinal slot $z^4$, and the lower end portion of the lever $y^7$ is provided with a pin $z^5$, which operates in said slot, and pivotally connected with the lever $y^7$ at $z^6$ is a bar $z^7$, which extends forwardly and the front end of which is provided with a rigid arm $2^a$, as shown in Fig. 4, which is loosely connected with the vertical shaft $3^a$, which is held in place by keepers $4^a$, secured to the front end wall $b^4$ of the inner frame. The shaft $3^a$ fits in a socket formed in the end of the arm $2^a$ and is adapted to turn therein within certain limits, and said arm is provided with an upwardly-directed lug or projection $5^a$, which operates in connection with a corresponding lug or projection $6^a$ on said shaft.

In the space between the front plate or wall $b$ of the inner frame and the front plate or wall $a$ of the main outer casing is placed a transverse bar $7^a$, which is movable transversely of the machine and the right-hand end of which is provided with a receptacle $2^b$, in which is placed a sponge or other absorbent material $3^b$, and this receptacle $2^b$ is also in communication with a longitudinal water-chamber $4^b$ in the right-hand end of the bar $7^a$.

The shaft $3^a$ is provided with an arm $5^b$, pivotally connected at $6^b$ with the bar $7^a$, and connected with the arm $5^b$ is a spring $7^b$, which is secured to the outer casing of the machine at $8^b$ and which holds the bar $7^a$ out of operative position or at the limit of its movement to the left. The front end plate or wall $b$ of the inner frame is provided near the right-hand side of the machine with a curved slot $2^c$, and the bar $7^a$ is provided near its right-hand end with a pin $3^c$, which passes through said slot and which is provided at its inner end with a collar $4^c$, and the object of this invention is to raise the right-hand end of the bar $7^a$ as said bar is moved to the right.

In practice I place on the envelop-table $a^6$ at the front of the machine or any suitable support a water can or tank $5^c$, which is provided with a faucet $6^c$, which passes inwardly through the front end plate or wall $a$ of the main outer casing and which is provided with a tap or valve $7^c$ and which opens directly over a small cup, pan, or other receptacle $8^c$, (shown plainly in Figs. 4, 10, and 11,) and connected with this cup, pan, or receptacle $8^c$ is a pipe or tube $2^d$, which extends transversely of the machine over the bar $7^a$ and is provided with a telescopic extension $3^d$, which is movable therein and the end of which is curved downwardly into the water receptacle or chamber $4^b$ in the end of the bar $7^a$ and is secured in the top wall of said receptacle $4^b$.

I also provide means for feeding the envelops into the machine and adjusting the machine to envelops of different sizes, and for this purpose I form in the envelop-table $a^6$ at the front of the machine slots or openings $4^d$, in which are placed movable slides $5^d$, having upwardly-directed lugs or projections $6^d$ at their front top edges, as shown in Figs. 1, 3, 14, and 15, and the slides $5^d$ are mounted on the shaft $7^d$, passing transversely through the front extension $a^5$ of the main frame or casing of the machine. The slides $5^d$ are preferably loosely mounted on the shaft $7^d$, and to keep said slides in position I provide at the top edges thereof and at one or both sides thereof fingers $8^d$, which project outwardly beneath the envelop-table $a^8$, and these fingers prevent the slides from tilting forward or backward.

Connected with the lower end of the lever $y^7$ at the left-hand side of the machine is a link-bar $2^e$, which is connected with a rack-bar $3^e$, movable through a keeper $4^e$, secured to the side plate or wall $b^4$ of the inner frame, and parallel with the rack-bar $3^e$ is another rack-bar $5^e$, also movable in the keeper $4^e$, and between the rack-bars $3^e$ and $5^e$ is placed a pinion $6^e$, and the direction of the movement of this pinion will depend upon the direction of the movement of the rack-bar $3^e$. Connected with the front end of the rack-bar $5^e$ is another lever $2^f$, having a longitudinal slot $3^f$, through which is passed a journal $4^f$, which is also passed through the outer plate or wall $a^4$ of the main outer casing, said casing being provided with a slot $5^f$, which corresponds with the slot $3^f$ in the lever $2^f$ and is similarly arranged, and the journal $4^f$ is provided at its inner end with a head $6^f$ and at its outer end with a screw-threaded member $7^f$, on which is placed a set-nut $8^f$. The lever $2^f$ is also provided at is upper end with a longitudinal slot $2^g$, through which passes one end of the shaft $7^d$, and both sides of the forwardly-directed extension $a^5$ at the front end of the main frame or casing are provided at the top thereof with a longitudinal opening $3^g$, in the bottom of which are formed rack-teeth $4^g$, and the shaft $7^d$ is provided at each end with a pinion $5^g$, and these pinions operate in connection with the rack-teeth $4^g$.

The journal $4^f$ may be secured at any desired point in the side plate of the forwardly-directed extension $a^5$ of the machine through which said journal passes and when the rack-bar $5^e$ is forced forward in the operation of the machine, as hereinafter described, the upper end of the lever $2^f$ is moved backwardly. This operation moves the shaft $7^d$ backwardly, and said shaft moves the slides $5^d$ backwardly, and the envelop is fed into the machine by means of the upwardly-directed lugs or projections $6^d$ of said slides which pass upwardly through the slots or openings $4^d$ in the envelop-table $a^6$. In this operation the pinions $5^g$ operate in connection with the rack-teeth $4^g$ at the bottom of the slots or openings $3^g$, and this compels the shaft $7^d$ to move regularly and evenly at both ends.

It will be understood from the foregoing description that the position of the shaft $7^d$ with reference to the front plate or wall $a$ of the main outer casing must be regulated to correspond with the size of the envelop which is desired to be fed through the machine and stamped and sealed, and it will also be apparent that the position of the shaft $7^d$ and the extent of the movement thereof may be regulated by the journal $4^f$ and the position thereof in the side wall of the extension $a^5$ at the front of the machine, and the position of said journal may, as will be understood, be regulated at any time to any extent by means of the set-nut $8^f$, by which it is clamped to the side wall of the forwardly-directed extension $a^5$ at the front end of the machine.

An examination of Fig. 21 of the drawings, which is a longitudinal section through the machine and which is intended simply to show the general construction and arrangement of those parts which extend transversely of the machine and also certain details of the stamp shifting and placing mechanism, will show that the front plate $a$ of the main outer casing and the front plate $b$ of the inner frame or casing extend downwardly only to the envelop table or tables, that part of said plates below said table or tables being omitted, so as to permit of the operation of the envelop-moistening tank $r^4$.

In the operation of this machine the envelops to be sealed or stamped are placed successively on the table $a^6$, with the flap opened and with the gummed side of said flap directed downward and said flap directed toward the slot $a^7$ in the front plate $a$ of the main outer casing. The lever $v^2$ is then depressed and immediately lifted into its normal position, and during this operation the envelop is passed into the machine by the lugs or projections $6^d$ of the slides $5^d$. This operation brings the stamp-space of the envelop directly under the plunger $p^9$ and also turns down the flap of the envelop which strikes the folder $r^8$. It will be understood, of course, that before the envelop is fed into the machine in the manner described a sheet of stamps is placed on the table $c$, said sheet of stamps being ten stamps wide and ten stamps long. The operation of feeding the envelop into the machine is accomplished by means of the lever $v^2$, the arm $u^7$, the link $u^6$, the arm $u^5$, the shaft $f^5$, the arm $z^7$, the lever $y^7$, the link-bar $2^e$, the rack-bar $3^e$, the pinion $6^e$, the rack-bar $5^e$, the bar $2^f$, and the shaft $7^d$, and said operation is accomplished at the downward movement of the lever $v^2$. During this operation the disk $g$ is turned to the right by the pawl $f^7$, and the arm $h^2$ is operated by the pin $q^5$ and moves forwardly, and the shaft $h$ is also turned forwardly, together with the arm $h^4$, which is operated thereby, and this operation depresses the bar $h^7$, which turns the shaft $h^9$ by means of the arm $h^8$, and the arms $i$ and $i^2$ move the stamp-shifter, comprising the parts $i^3$, $i^4$, and $i^5$, transversely of the machine and to the right. When the stamp-sheet is placed in position on the table $c$, the corners thereof adjacent to the bar $i^3$ of the stamp-shifter are placed under the pins $j^2$ and $j^7$ and are held by the said pins operating in connection with the fingers $j^5$ and $k^2$, which are connected with the said members $i^4$ and $i^5$ of the stamp-shifter, and the movement of the stamp-shifter to the right as above described carries the sheet of stamps toward the right of the machine through a space equal to the width of one strip of stamps, and in this operation the said strip of stamps is placed beneath the knife $k^5$ and said knife rests directly over the first line of perforations in the sheet of stamps, and in this operation the pins $j^2$ and $j^7$ also rest on the sheet of stamps over said line of perforations. In the above operation the movement of the sheet of stamps, as is hereinbefore stated, is only equal to the width of one strip of stamps, and this operation is accomplished by reason of the fact that the ratchet-wheel $f^8$ on the shaft $g^2$ and connected with the disk $g$ is provided with ten teeth, and a pin $2^g$ on the arm $f^4$ raises the pawl $f^7$ and prevents said pawl from turning the wheel $g$ more than one-tenth of a revolution, and during the above operation and near the close thereof pin $q^4$ on the disk $g$ strikes the lower end of the lever $m^3$, and this lever forces the knife $k^5$ forwardly and downwardly, which operation cuts off the first strip of stamps from the sheet on the table $c$, and at the end of this operation the knife $k^5$ is raised and moved back into its normal position by a spring $3^g$, connected therewith and with the top plate $b^6$ of the inner frame or casing of the machine. The link-bar $f^2$, being connected with the upper end of the arm $f^4$ it will be apparent that in the operation hereinbefore described when the operating-lever $v^2$ is depressed said link-bar will be thrown or pulled backwardly and the disk $c^5$ will be turned backwardly or to the right. In this operation the pin $d$, which is connected with the disk $c^5$, will depress the rear end or arm $s^8$ of the lever $s^6$, and the sectorial plate $t^2$ is turned backwardly and the stamp-holder $t^8$ drops so that the transversely-projecting end thereof rests on the edge of the end stamp of the strip that has been cut off. At this same time the pin $d^2$ on the disk $c^5$ strikes the backwardly-directed end $q^6$ of the dog $q^4$ and causes said dog to depress the arm $m^8$ of the lever $m^7$, and said lever $m^7$, or the upper end thereof, is moved backwardly and the pins $o^6$ and $n^7$ move backwardly. The pin $o^6$ moves over the dog $o^5$, and at the limit of the backward movement of the lever $m^7$ these pins again grasp and hold the end of the strip of stamps, and the object of the dog $o^5$ is to raise the pin $o^6$ in its backward movement, so that it will not interfere with the stamp or stamps. At this time the pin $d^4$ on the disk $c^5$ strikes the under side of the arm $m^8$ of the lever $m^7$ and forces said lever forwardly, thus carrying the strip of stamps forward, so that the end stamp occupies the space $q$ under the plunger $p^9$. At this time the bar $z^7$ on the left-hand side of the machine is moved backwardly by means of its connection with the shaft $f^5$, and this operation turns the shaft $3^a$, which is accomplished by means of the arm $2^a$, and the turning of the shaft $3^a$ moves the bar $7^a$ to the right, and the right-hand end of said bar is raised by means of the pin $3^c$, which operates in the slot $2^c$, and the sponge or other absorbent material $3^b$ is raised and forced into contact with the bottom of the stamp, which is moistened, as will be readily understood. At the end of the above-described operation the pin $d^6$ on the disk $c^5$ strikes the rear end of the lever $e^2$, and the forward end of this lever raises the bar $p$, and the lever $p^3$ is operated to depress the plunger $p^9$, and the stamp is cut off and applied to the envelop by the downward movement of the plunger $p^9$. During the above operation the lever $s^6$ is returned to its normal position by the pin $d$, which strikes the rear end of the lever $u^2$, and the lever $e^2$ is also returned to its normal position by the lever $e^4$, the rear end of which is struck by the pin $d^6$. At or about the end of the operation by which the stamp is applied to the envelop the moistening-tank $r^4$ is thrown backwardly by means of its connection with the shaft $r^3$, said shaft being operated by the arm $r^2$, which is secured thereto and which is in operative connection with the lever $e^8$, which lever is operated by the pin $d^8$ of the disk $c^5$, which strikes the rear end of said lever, and the flap of the envelop which is caught between the moistening-tank and the folder $r^8$ is moistened, as will be readily understood. The pin $d^7$ of the disk $c^5$ now strikes the backwardly-directed end of the lever $e^7$, which lever strikes the backwardly-directed end of the lever $e^8$ and returns the moistening-tank to its normal position or that shown in Fig. 21. It will be observed that the folder $r^8$ is held in its raised position, or that shown in Fig. 21, by the spring $s$, and at the end of the application of the stamp and the moistening of the flap of the envelop the pin $d^3$ passes through the slot $7^m$ in the arm $m^8$ of the lever $m^7$, said slot being shown in Fig. 20, and this pin strikes the backwardly-directed end of the lever $s^4$, and said lever by means of its connection with one of the pins $s^2$, secured to the folder $r^8$, depresses said folder, and this depression of said folder by the lever $s^4$, which is at one end thereof, will lower said folder at one end and at the middle, so as to allow the envelop to pass thereover, and as soon as the envelop passes over the folder the springs $s$ return the latter to its normal position. In the downward movement of the operating-lever $v^2$, during which the various operations hereinbefore described occur, the rack-bar $w^6$ at the left-hand side of the machine moves forwardly and the separate pairs of rollers $v^5$ and $v^4$ turn so as to feed the envelop backwardly through the machine; but during this operation the envelop reaches the forward set or pair of rollers $v^4$ and $v^5$ and passes between the same, and at this time the lever $v^2$ is raised and in the reversal of the movement of the lever $v^2$ the shaft $f^5$ is turned forwardly, and in this operation the rack-bar $w^6$ is moved backwardly and the movement of the rollers $v^4$ and $v^5$ is continued, so as to pass the envelop backwardly through the machine, and in this operation the envelop is sealed and discharged through the chute $c^3$. It will be understood that the disk $c^5$ is turned to the right when the lever $v^2$ is depressed and turned to the left when said lever is raised, and when the said disk is turned to the left the spring-operating pins connected therewith pass under the parts in connection with which they operate and in the opposite movement of said disk all the parts assumed their normal position and that in which the lever $v^2$ occupies in its raised position.

Instead of using a sheet of stamps ten stamps long and ten stamps wide the said sheet may be of any desired length, and it may be wound on a roller $6^r$, mounted between the plates $b$ and $b^2$ of the inner frame or casing and near the left-hand side of the machine, and in the operation of the machine as hereinbefore described the sheet of stamps will be automatically unrolled from this roller.

This machine is simple in construction and operation and comparatively inexpensive and by means thereof large numbers of envelops may be quickly sealed and stamped.

My invention is not limited to the exact construction of the details herein shown and described, and I reserve the right to make all such alterations in and modifications thereof as fairly come within the scope of the invention.

Having fully described my invention, what I claim as new, and desire to secure by Letters Patent, is—

1. A machine of the class described, comprising a suitable frame or casing, a stamp-sheet table located in the top portion thereof, a supplemental envelop-table arranged beneath the stamp-table, a main envelop-table at the front of the machine and in the same horizontal plane as the supplemental envelop-table, a depressible flap-folder mounted transversely of the machine between the main and the supplemental envelop-tables and normally slightly above said tables a swinging moistening-tank mounted transversely of the machine in front of the flap-folder means for depressing the flap-folder and for swinging the moistening-tank, and means for applying a stamp to the envelop, substantially as shown and described.

2. A machine of the class described, provided with main and supplemental envelop-tables, a vertically-movable spring-supported envelop-flap folder placed transversely of the machine between said tables and normally held above the same and the front side of which is inclined downwardly and backwardly, a plurality of pairs of rollers arranged rearwardly of said flap-folder the separate parts of each pair being mounted respectively above and below the supplemental envelop-table and being in frictional contact, a moistening-tank supported transversely of the machine in front of the flap-folder and adapted to swing forwardly and backwardly, devices for operating said parts and means for stamping the envelop, substantially as shown and described.

3. In a machine of the class described, a frame, a main outer casing inclosing said frame, a stamp-sheet table at the top of said frame, a main envelop-table at the front of the machine, a supplemental envelop-table arranged beneath the stamp-sheet table rearwardly of and in the same horizontal plane as the main envelop-table, a vertically-movable spring-supported envelop-flap folder arranged transversely between the supplemental and main envelop tables, a moistening-tank arranged transversely of the machine in front of the envelop-folder and adapted to swing forwardly and backwardly, means for operating said parts and for feeding an envelop through the machine, and devices for applying a stamp thereto, substantially as shown and described.

4. In a machine of the class described, a frame or support, a main outer casing inclosing said frame or support and provided with a front extension having a main envelop-table, a supplemental envelop-table arranged rearwardly of the main envelop-table within said frame, a stamp-sheet table placed over the supplemental envelop-table, a vertically-movable spring-supported envelop-folder placed transversely of the machine between the main and supplemental envelop-tables, a swinging flap-moistener placed transversely of the machine in front of the envelop-folder, devices for operating said parts, other devices for feeding an envelop through the machine, and means for applying a stamp to the envelop, substantially as shown and described.

5. In a machine of the class described, a frame or support a main outer casing inclosing said frame or support and provided with a front extension, having a main envelop-table, a supplemental table arranged within the frame or support rearwardly of and in the same plane as the main envelop-table, an envelop-chute rearwardly of the supplemental envelop-table, a stamp-sheet table arranged over the said supplemental envelop-table and said chute, a vertically-movable spring-supported flap-folder placed transversely between the main and supplemental envelop-tables, a swinging flap-moistener supported transversely of the frame or support in front ot the flap-folder, feed-rollers arranged in pairs rearwardly of the flap-folder the separate members of each pair being arranged above and below the supplemental envelop-table and being in frictional contact, devices for operating the flap-moistener, the flap-folder and the feeding-rollers and means for applying a stamp to the envelop, substantially as shown and described.

6. A machine of the class described provided with a stamp-sheet table, main and supplemental envelop-tables, a flap-folder, a flap-moistening device, means for feeding an envelop through the machine devices for operating the flap-folder, means for operating the flap-moistening device, a stamp-sheet shifter, devices for cutting off a strip of stamps from the stamp-sheet, means for feeding a strip of stamps transversely of the machine and a device for cutting off a stamp from the end of said strip and applying the same to the envelop, substantially as shown and described.

7. A machine of the class described provided with main and supplemental envelop-tables, arranged in the same horizontal plane, a depressible envelop-flap folder placed between said supplemental and main tables, and the upper side of which is normally above said tables and the front side of which is inclined downwardly and backwardly, a flap-moistening device mounted in front of the flap-folder and movable forwardly and backwardly, devices for operating the flap-folder, means for feeding an envelop through the machine and devices for applying a stamp to the envelop, substantially as shown and described.

8. A machine of the class described, provided with a stamp-sheet table, a main envelop-table at the front of the machine and below the stamp-sheet table, a supplemental envelop-table beneath the stamp-sheet table and in the same horizontal plane as the main envelop-table, means for feeding the envelop through the machine, devices for folding and sealing the flap of the envelop as it passes through the machine, a stamp-sheet shifter placed over the stamp-sheet table and adapted to move the stamp-sheet transversely of the machine, devices for cutting a strip of stamps from said sheet, means for moving said strip longitudinally of the machine and devices for cutting a stamp from the end of said strip and applying it to an envelop, substantially as shown and described.

9. A machine of the class described provided with a stamp-sheet table, a stamp-sheet shifter comprising a horizontal bar arranged over said table and having parallel end members, inwardly-directed fingers connected with said end members, spring-depressed pins connected with said bar and operating in connection with said fingers to hold a sheet of stamps and means for moving said shifter transversely of the stamp-sheet table, substantially as shown and described.

10. A machine of the class described provided with a stamp-sheet table, means for moving a sheet of stamps transversely of said table, devices for cutting a strip of stamps from said sheet, devices for moving said strip longitudinally of said table, a transversely-movable bar mounted at the end of said table and provided in one end with a stamp-moistening device, means for operating said bar so as to moisten the end stamp of said strip, and a vertically-movable plunger adapted to cut off said stamp and apply it to an envelop, substantially as shown and described.

11. A machine of the class described provided with a front extension having a main envelop-table at the top thereof, a shaft passing transversely through said extension below said table, said table being also provided with parallel slots or openings ranging forwardly and backwardly therein, slides mounted on said shaft and adapted to move an envelop lying on said table forwardly, means for moving said shaft forwardly and backwardly, consisting of an adjustable journal connected with the side of the extension at the front of the machine, a lever provided with a slot, through which the end of said shaft passes and in connection with said journal, and means for operating said lever, substantially as shown and described.

12. A machine of the class described, provided with a stamp-sheet table, main and supplemental envelop-tables arranged in the same horizontal plane, the supplemental envelop-table being beneath the stamp-sheet table and the main envelop-table being at the front of the machine, means for feeding the envelop through the machine over said envelop-tables, devices for moistening the flap of the envelop and sealing the same as the latter passes through the machine, means for shifting the stamp-sheet transversely of the machine, a knife arranged longitudinally over the stamp-sheet table and adapted to cut a strip of stamps from said sheet, means for operating said knife, devices for moving said strip forwardly, a transversely-movable stamp-moistening device at the front of the machine and adapted to moisten the end stamp of said strip, devices for operating said moistening device and a vertically-movable plunger adapted to cut a stamp from the end of said strip and to depress it onto an envelop, substantially as shown and described.

13. A machine of the class described, provided with a stamp-sheet table, a stamp-sheet shifter movable transversely of said table, a knife for cutting off a strip of stamps from said sheet, means for operating said knife, devices for moving the strip of stamps longitudinally of the machine, a transversely-movable moistening device at the end of the machine, means for operating said moistening device so as to moisten a stamp at the end of said strip, means for feeding an envelop through the machine beneath the stamp-sheet table, devices for folding and sealing the flap of the envelop as it is fed through the machine, and a vertically-movable plunger adapted to cut off a stamp from the end of said strip and apply the same to the envelop as it passes through the machine, substantially as shown and described.

14. A machine of the class described, provided with a stamp-sheet table, means for shifting a sheet of stamps transversely thereof, means for cutting a strip of stamps from said sheet, devices for moving said strip longitudinally of the machine comprising a lever $m^7$, a vertically-movable spring-depressed bar connected with said lever, transversely-arranged pins in the top of said lever and said bar, and means for operating said lever and said bar and said pins, substantially as shown and described.

15. A machine of the class described, provided with a stamp-sheet table, means for shifting a sheet of stamps transversely of said table, a knife for cutting off a strip of stamps from said sheet, and means for moving said strip longitudinally of the machine comprising a dog $o^5$ pivotally supported at one side of the machine, a vertically-arranged lever, a spring-depressed bar connected with said lever, inwardly-directed pins in the ends of said lever and said bar, the pin in the end of said lever being adapted to move over said dog and the pin in the end of said bar being adapted to move under said dog, a vertically-movable stamp-strip holder mounted adjacent and in front of said lever and means for operating said lever and said bar, substantially as shown and described.

16. A machine of the class described provided with main and supplemental envelop-tables arranged in the same horizontal plane, a plurality of pairs of feed-rollers, the separate members of which are arranged above and below the supplemental envelop-table and in frictional contact, one roller of each pair being also provided with a pinion, means for turning the rollers of each pair in opposite directions consisting of a rack-bar provided with two parallel members separated by a space the width of which is greater than the diameter of said pinions, and means for moving said rack-bar longitudinally and for raising and lowering the same, substantially as shown and described.

17. A machine of the class described provided with a main shaft, a slotted arm connected with said shaft, a slotted lever connected with said arm, a longitudinally-movable rack-bar provided with a pin which operates in the slot of said lever, a vertically-movable plate in connection with which said rack-bar operates, links connected with said plate, crank-levers connected with said links, a slotted bar connected with said levers, a pin or journal connected with the first-named lever and operating in the slot of the last-named bar, lugs or projections connected with the opposite sides of the first-named lever, pins in connection with which said lugs or projections operate and means for operating said main shaft, substantially as shown and described.

18. A machine of the class described, provided with main and supplemental envelop-tables, a shaft mounted transversely beneath the main envelop-table and movable forwardly and backwardly, envelop-feeding devices connected with said shaft, rollers mounted in pairs above and below the supplemental envelop-table and in frictional contact, pinions connected with the corresponding rollers of the said pairs, a vertically-movable plate at one side of the machine and through which the shaft of said rollers projects, a rack-bar movable longitudinal of said plate and provided with parallel members, the space between which is wider than the diameter of said pinions, a main shaft passing transversely through the machine, devices in operative connection with said shaft, said rack-bar and said plate for moving said plate vertically and said rack-bar longitudinally, and other devices in operative connection with said shaft, and the shaft beneath the main envelop-table for moving said last-named shaft backwardly and forwardly, substantially as shown and described.

19. A machine for sealing and stamping envelops, comprising an inner frame or support, and an outer casing inclosing said frame or support and provided at the front with an extension having a main envelop-table, a supplemental envelop-table arranged within the frame or support and in the same horizontal plane as the main envelop-table, a plurality of pairs of rollers mounted transversely of the machine, the separate members of each pair being above and below the supplemental envelop-table and being in frictional contact, a vertically-movable envelop-folder placed between the main and supplemental envelop-tables and normally held above the same, a flap-folding device supported in front of said folder and movable backwardly and forwardly, devices beneath the main envelop-table for passing an envelop in the machine, and means for operating all of said devices so as to pass an envelop through the machine, substantially as shown and described.

20. A machine for sealing and stamping envelops, comprising an inner frame or support and an outer casing inclosing said frame or support and provided at the front with an extension having a main envelop-table, a supplemental envelop-table arranged within the frame or support and in the same horizontal plane as the main envelop-table, a plurality of pairs of rollers mounted transversely of the machine, the separate members of each pair being above and below the supplemental envelop-table and being in frictional contact, a vertically-movable envelop-folder placed between the main and supplemental envelop-tables and normally held above the same, a flap-moistening device supported in front of said folder and movable backwardly and forwardly, devices beneath the main envelop-table for passing an envelop in the machine, means for operating all of said devices so as to pass an envelop through the machine, and means for applying a stamp to the envelop as it passes through the machine, substantially as shown and described.

21. A machine of the class described provided with means for folding and sealing the flap of an envelop and passing said envelop through the machine, a stamp-sheet table arranged in the top portion of the machine, means for moving a sheet of stamps transversely of said table, a knife for cutting off a strip of stamps from said sheet, devices for moving said strip longitudinally of the machine, a transversely-movable bar arranged at one end of the machine and provided with stamp-moistening devices, means for operating said bar so as to moisten the end stamp of said strip, and a vertically-movable plunger for cutting off said stamp and applying it to the envelop, substantially as shown and described.

22. A machine of the class described provided at one side with a main operating-disk, a supplemental operating-disk arranged rearwardly of the main operating-disk and provided with a ratchet-wheel, a main shaft arranged rearwardly of the supplemental operating-disk and passing through the machine, a supplemental-operating-disk shaft, a main operative lever in operative connection with the main shaft, devices for connecting the main shaft with the main operating-disk, devices in operative connection with the main operating-disk for passing an envelop into the machine other devices in connection with said shaft for folding and moistening the flap of the envelop, devices in operative connection with the main shaft for passing the envelop through the machine and for sealing the flap thereof and other devices in operative connection with the main operating-disk, and the supplemental shaft for applying a stamp to the envelop, substantially as shown and described.

23. A machine of the class described provided with separate pairs of feed-rollers arranged vertically and transversely therein, a horizontal envelop-table having openings through which the separate rollers of each pair are placed in frictional contact, a vertically-movable plate at one side of the machine through which the shafts of said rollers pass, a pinion connected with the bottom roller of each pair, a longitudinal rack-bar mounted in said plate and provided with two members, the space between which is greater in width than the diameter of said pinions, devices for moving said rack-bar longitudinally of said plate and devices for moving said plate vertically, substantially as shown and described.

24. A machine of the class described provided with a main envelop-table having parallel slots formed therein, a shaft mounted beneath said table, blocks or slides connected with said shaft and provided with projections extending up through said slots or openings, and fingers connected with said blocks or slides at the top thereof and projecting beneath said table and in contact therewith, substantially as shown and described.

25. In a machine of the class described a transversely-movable bar provided at one end with a water-receptacle, a moistening device in connection therewith telescopic tubes for supplying water to said receptacle, and means for supplying water to said tubes, substantially as shown and described.

26. A machine of the class described provided with a vertically-movable L-shaped stamp-holder, a pivotally-supported triangular plate pivoted near one corner and the opposite corners of which are provided with projections, the side edge of said plate between said projections and opposite the pivotal support being curved or segmental in form, said plate being also in operative connection with the stamp-holder, substantially as shown and described.

In testimony that I claim the foregoing as my invention I have signed my name, in presence of the subscribing witnesses, this 18th day of June, 1902.

CHARLES A. MADSEN.

Witnesses:
T. A. STEWART,
J. C. LARSEN.